United States Patent [19]
Paden

[11] 3,792,875
[45] Feb. 19, 1974

[54] BICYCLE TRAILER
[76] Inventor: Jack R. Paden, 527 Mesilla N.E., Albuquerque, N. Mex. 87108
[22] Filed: Nov. 27, 1972
[21] Appl. No.: 309,622

[52] U.S. Cl. .............................. 280/204, 280/503
[51] Int. Cl. ............................................. B62k 27/06
[58] Field of Search ... 280/203, 204, 292, 489, 503, 280/63, 124 B; 267/57

[56] References Cited
UNITED STATES PATENTS
3,347,559  10/1967  Robinson ............................ 280/204
2,227,762  1/1941  Ronning ................................ 267/57
FOREIGN PATENTS OR APPLICATIONS
867,474  11/1941  France ................................ 280/204

Primary Examiner—David Schonberg
Assistant Examiner—Terrance L. Siemens
Attorney, Agent, or Firm—Robert M. Betz

[57] ABSTRACT

A collapsible two-wheeled package carrying trailer which employs independent torsion bar suspension with respect to each wheel and which is adapted to be coupled with a propelling vehicle or operated as a handcart. A pair of supporting arms on either side of the trailer extend upward and forward from the separated axles of the two wheels and are joined at their forward ends by a torsion bar disposed transversely in front of a carrying frame from which a flexible receptacle is dependently supported. The torsion bar passes through the upper end of a control housing extending vertically downward therefrom in front of the receptacle equidistant between the wheels. In operation, the midpoint of the torsion bar is fixed in relation to this housing so that it is prevented from rotating with respect to its longitudinal axis. The carrying frame is cantilevered with respect to the lower end of the control housing and forwardly connected in pivotal relation to a cylindrical torsion bar housing encasing the torsion bar. Vertical loading of the receptacle is transmitted laterally through the torsion bar housing, causing the support arms to swing downwards. This in turn distorts the two ends of the torsion bar about its fixed midpoint, thereby generating separate restoring forces. A pulling tongue pivotally mounted to the control housing is configured to minimize transmittal of vibration rearward to the trailer. Quick release universal coupling means are provided for attachment of the tongue to the propelling vehicle to permit maximum lateral and vertical misalignment with the trailer.

13 Claims, 11 Drawing Figures

BICYCLE TRAILER

BACKGROUND OF THE INVENTION

1. Field of the Invention

This invention relates generally to lightweight two-wheeled package carrying trailers to which a pulling tongue may be attached for coupling to a propelling vehicle such as a bicycle. More particularly the invention is concerned with vehicles of this type which employ a torsion bar suspension system and which are easily collapsible for transport or storage.

2. Description of the Prior Art

So far as the applicant has been able to determine existing two-wheeled trailers for bicycles and other propelling vehicles are subject to a number of disadvantages which it is believed the present invention overcomes. Typically existing bicycle trailers employ two wheels connected by an axle with little or no attention being given to the spring suspension of the carrying receptacle with respect to this axle. The result is that such trailers have an extremely hard riding quality which makes it impractical to carry loads over any rough terrain or where sudden obstacles such as curbs may intervene. Another feature generally lacking in these trailers is collapsibility, that is, an interrelation of parts such that without the use of any tools the structure may be quickly assembled for use or disassembled and folded on itself into a package of convenient size and configuration for hand carrying or storage such as in the trunk of an automobile.

A further disadvantage of existing trailers is that in relation to size and weight they have relatively small carrying capacity. This is important, since in the present era of popularity of the ten-speed bicycle such vehicles are being used more and more not only for sporting purposes but also for carrying relatively heavy items for short distances.

Another drawback of two-wheeled trailers lies in the method of coupling or hitching to the propelling vehicle. There appear to be two common types of hitching arrangement in use today; one involves connecting a tongue to the stem under the saddle of a bicycle or similar vehicle and the other is accomplished by coupling in some manner directly to or adjacent the axle of the rear wheel of the propelling vehicle. However, the height above the ground of these two coupling points will vary considerably with different makes and models. Consequently, existing trailer tongues are difficult to adjust so that the necessary coupling may be made conveniently in all cases.

An important attribute of a successful trailer hitch is that it should be quickly attachable and releasable as well as permitting a wide range of angular variation in the vertical and horizontal planes between the tongue and the propelling vehicle. The first of these is mainly a convenience feature while the second importantly affects the mobility and maneuverability of the bicycle-trailer combination. Neither of these features is found to be adequately provided in existing devices.

Since a bicycle itself is not ordinarily provided with any substantial means for spring suspension, the tongue of a trailing vehicle will be subjected to considerable vibration at the point of coupling. Therefore unless some means are provided for isolating the tongue coupling from its point of attachment to the trailer the bicycle tends to further degrade the trailer's riding qualities. Prior art trailer-tongue couplings have not appeared to solve this particular problem.

SUMMARY OF THE INVENTION

In consequence of the disadvantages of prior art two-wheeled trailers as outline above it is therefor a general object of the present invention to provide a two-wheeled package carrying trailer which is light in weight and quickly collapsible for hand carrying or storage and readily assemblable for use.

It is a further object of this invention to provide a two-wheeled package carrying trailer employing independent torsion bar suspension with respect to each wheel.

It is an additional object of this invention to provide a two-wheeled package carrying trailer having means for improved universal coupling with a propelling vehicle.

It is yet another object of this invention to provide a tongue attachment for a two-wheeled package carrying vehicle which is pivotally adjustable to accomodate varying coupling positions to a propelling vehicle and to facilitate conversion from use as a trailer to a handcart.

It is still further object of this invention to provide a two-wheeled trailer with flexible carrying means readily adjustable to meet diverse loading requirements.

Other objects and advantages of this invention will become apparent from a consideration of the following specifications and drawings taken in conjunction with the appended claims made a part thereof.

In accordance with the above objects an embodiment of this invention, in summary, comprises a two-wheeled trailer having a flexible receptacle depending from a rigid carrying frame supported independently with respect to each of the wheels by a torsion bar assembly. A first pair of supporting arms extend upwardly and forwardly from the separate axles of the wheels on either side of the frame and have their forward ends connected by a transverse torsion bar supported within a cylindrical torsion bar housing positioned in front of the frame so that the bar tends to rotate relative to its own longitudinal axis as the first pair of supporting arms swing about the wheel axles. The torsion bar housing comprises a pair of like cylindrical tubes substantially encasing the two halves of the torsion bar respectively in coaxially spaced relation therewith, the tubes being rigidly connected to the two forward ends of the first pair of supporting arms and extending toward each other therefrom so that their facing ends are adjacent. The torsion bar housing additonally comprises a cylindrical sleeve extending concentrically within and between the pair of cylindrical tubes in rotatable touching relation to their inner surfaces so that the tubes are maintained in axial alignment.

A hollow rectangular control housing extends vertically downward in front of the frame equidistant between the wheels, the upper end of the control housing being adapted to support therein the facing ends of the tubes so that they are free to rotate within the housing. A pivot arm within the housing fixed to the midpoint of the torsion bar between the facing ends of the tubes depends therefrom at right angles to the longitudinal axis of the torsion bar, said pivot arm being adapted to pivot into load-bearing contact with the inner surface of the housing responsive to downward rotation of the first pair of supporting arms.

In order to interconnect the frame and receptacle with the torsion bar assembly means are provided which extend forwardly from the frame on either side for clamping the frame in pivotal relation to the two cylindrical tubes. A second pair of supporting arms extend forwardly and downwardly on either side of the receptacle from a point intermediate the front and rear of the frame, and means are provided for transversely interconnecting the forward ends of this second pair of arms in fixed relation to the lower end of the housing.

Additionally the invention comprises a pulling tongue for coupling to a propelling vehicle consisting of a first and second straight tubular section joined integrally at a predetermined acute angle. Means are included for pivotally connecting the ree end of the first section to the control housing intermediate its upper and lower ends so that the first section extends transversely to the receptacle, the connecting means additionally including means for continuous adjustment of the inclination of the second section with respect to the horizontal responsive to the rotation of the first section about its own longitudinal axis.

The coupling apparatus generally comprises an elongated mounting bracket connected between the axle of the rear wheel of a propelling vehicle and a portion of the vehicle chassis forward of such axle. A coupling hook is fixed to the bracket intermediate its two ends which is adapted to rotate freely about its own axis and extend from the bracket outwardly at a predetermined angle. The adjacent end of the tongue terminates in a slidable yoke which has an axially extending loop portion adapted for universal swivel engagement with the hook and spring actuated means communicate with the yoke so that it may be quickly locked and released by pushing a button.

DETAILED DESCRIPTION

Figure 1:
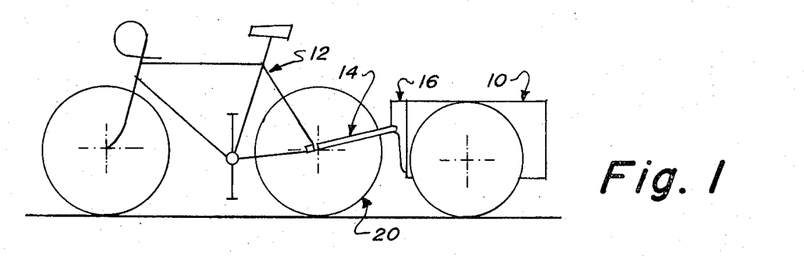
FIG. 1 is a diagramatic side elevation showing the general configuration of the trailer and its manner of attachment to a propelling bicycle.

In the diagramatic view of FIG. 1 the general organization of a preferred embodiment of this invention in use is shown wherein a two-wheeled trailer 10 is coupled to a bicycle 12 by means of a tongue 14 one end of which is pivotally attached to an elongated control housing 16 extending downward at the front of the trailer 10, the other end being universally coupled to the axle of the rear wheel 20 of the bicycle 12.

Figure 2:
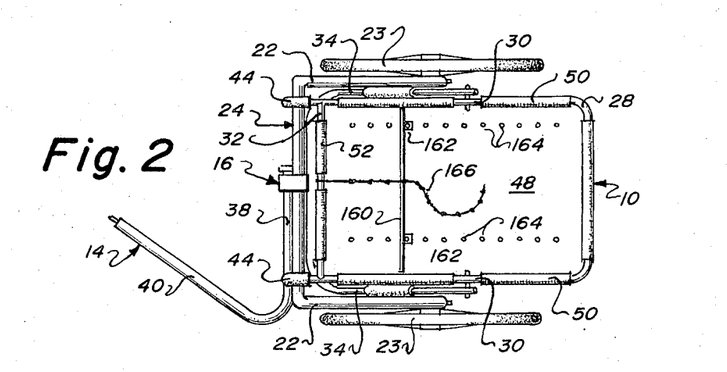
FIG. 2 is a plan view of the trailer of this invention showing the rectangular carrying frame, the first pair of supporting arms extending forward and joined by the transverse torsion bar housing which encases the torsion bar and associated elements, and the pulling tongue with its tubular sections disposed at an angle to each other.
Figure 3:
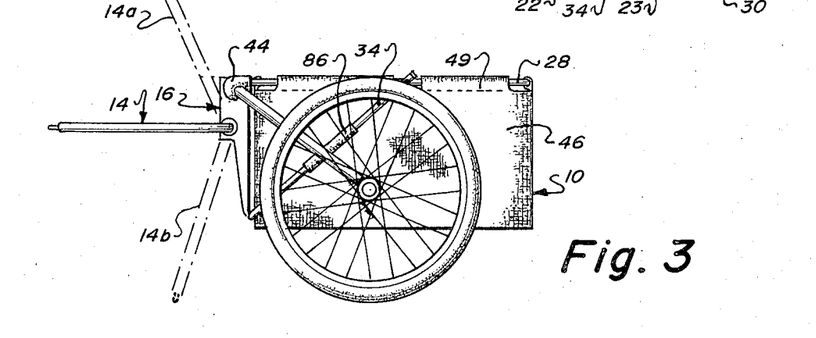
FIG. 3 is a side elevation of the trailer which emphasizes the relative inclination of the first and second pairs of supporting arms, shows how the forward ends of these arms are related to the vertical control housing, and further reveals the pivotal interconnection between the tongue and the control housing.

With reference now to FIGS. 2 and 3, the outer structural elements of the trailer 10, preferably formed of lightweight aluminim tubing or sheetstock as appropriate, comprise a first pair of support arms 22—22 extending upwardly and forwardly from the separate axles of the trailer wheels 23—23, the forward ends of the support arms 22—22 being connected by a transverse tubular torsion bar housing 24. The generally rectangular control housing 16, positioned at the front of the trailer 10 equidistant between the trailer wheels 23—23, may conveniently be formed of extruded aluminum stock. It is provided with apertures adjacent its upper end to receive the torsion bar housing 24, extends vertically downward from that point, and constitutes the central structural element of the trailer 10.

A receptacle carrying frame 28 consists preferably of a horizontal U-shaped member having side rails 30-30 joined transversely at their rearward ends, the front ends thereof being connected by a crossbrace 32 closely adjacent to and rearward of the torsion bar housing 24 but not connected directly to the control housing 16.

Extending forwardly and downwardly from an intermediate point along the side rails 30—30 are a second pair of supporting arms 34—34 which are adapted to pass inward of the first pair of supporting arms 22—22 in touching relation. The forward ends of the supporting arms 34—34 are rigidly interconnectable with the lower end of the control housing 16 as will become apparent from subsequent figures.

At a level intermediate the top and the bottom ends of the control housing 16 the pulling tongue 14 is pivotally attached thereto. The tongue 14 preferably comprises a section of tubing bent at an acute angle to form a first section 38 extending transversely and horizontally from its point of attachment to the control housing 16 and continuing into a second section 40 extending at a predetermined angle to the longitudinal trailer axis, terminating at its forward end in a locking means to be described adapted to cooperatively couple with the bicycle adjacent its rear axle. The tongue 14 may be pivoted upward to a position such as the dotted outline 14a or downward to make contact with the ground in a position such as dotted outline 14b. This facilitates use of the trailer 10 not only in connection with coupling positions of varying heights but enables one to pull the trailer 10 as a handcart or to drop the tongue 14 to act as a kickstand.

Affixed to and extending forwardly from the forward ends of the side rails 30—30 are a pair of mounting clamps 44—44 which are adapted to engage the torsion bar housing 24 pivotally adjacent its two ends. This may be conveniently accomplished by constructing the forward portion of the mounting clamps 44—44 of lubricated plastic and providing therein a downwardly opening annular groove which can be releasably snap-fit over the surface of the torsion housing 24.

Dependently supported from the carrying frame 28 and the crossbrace 32 is a flexible package carrying receptacle 46, such as a heavy canvas bag, which is provided with a stiff rectangular bottom insert 48 which serves to stabilize the receptacle 46, give it form, and act as a supporting surface for articles to be transported.

The top edge of the receptacle 46 may be folded inwardly and hemmed along its two sides such as along line 49, and also along the front to form side pockets 50—50 and front pocket 52 which are adapted to accomodate the side rails 30—30 and the crossbrace 32 respectively. In assembly, the side rails 30—30 are inserted within the pockets 50—50 from the rear, the crossbrace 32 being then inserted within the front pocket 52 and fastened to the forward ends of the side rail 30—30 in a suitable manner, as by screw fastening. To complete the receptacle assembly the rear top edge of the receptacle 46 is folded inwardly over the rear transverse portion of the frame 28 and secured in position by suitable snap fasteners (not shown) affixed adjacent such rear top edge.

TORSION-BAR ASSEMBLY

Figure 4:
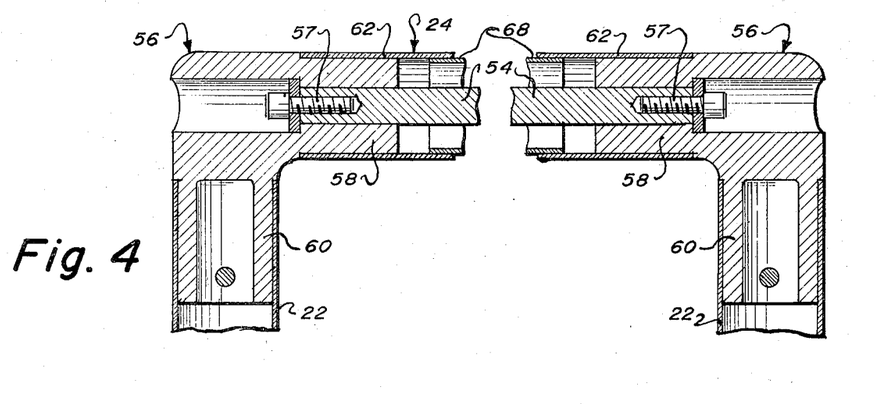
FIG. 4 is a broken longitudinal section through the first pair of support arms and the interconnecting torsion bar housing showing the torsion bar encased therein.

The basic assembly which underlies the suspension system of the trailer 10 may now be examined in greater detail with particular reference first to FIG. 4. A torsion bar 54, preferably formed of a rectangular cross section alloy steel, extends concentrically within the torsion bar housing 24 and is connected at its two ends to a pair of elbows 56—56, for example of solid cast aluminum, which are in turn connected rigidly to the forward ends of the support arms 22—22. A pair of recessed screw fasteners 57—57 within each of elbows 56—56 are aligned with the axis of the torsion bar 54 and adapted to be secured to its ends when positioned snugly within matching rectangular recesses in legs 58—58, which insures that the torsion bar 54 will rotate integrally with the support arms 22—22 and also prevents its lateral displacement. A reduced diameter portion of each of the legs 60—60 of the elbows 56—56 may be press-fit within the forward end of each of the support arms 22—22 and secured as by riveting. A similar reduced diameter portion of each of legs 58—58 is adapted to be press-fit respectively within one end of each of a pair of torsion tubes 62—62 which form the outer surface of the torsion bar housing 24 and which extend in axial alignment with each other so that their facing ends are confined adjacently within the control housing 16. The purpose of the torsion tubes 62—62 is not only to lend stiffness to the assembly, particularly in the event of lateral forces in the trailer 10, but also provide a convenient means for interconnection with the mounting clamps 44—44. It should be carefully noted that the torsion tubes 62—62 do not join together, since they must be free to turn within the control housing 16.

Figure 5:
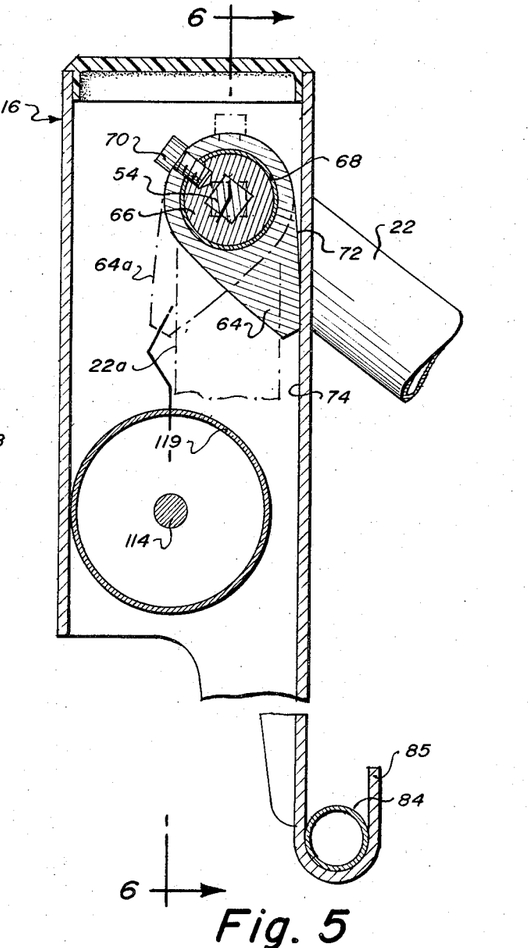
FIG. 5 is a vertical section through the control housing showing the pivot lever surrounding the midpoint of the torsion bar in load-bearing contact with the rear surface of the housing. It is also shown in a forwardly tilted position corresponding to a vertical orientation of the first pair of supporting arms assumed in a disassembled condition of the trailer. The view also shows the saddle at the base of the control housing for anchoring a transverse member connecting the second pair of supporting arms.

The midpoint of the torsion bar 54 must be confined so that it may not rotate with respect to its own longitudinal axis responsive to vertical loading of the trailer 10. To this end, a pivot lever 64 as seen in FIG. 5, is fixedly interconnected with the torsion bar 54 within the control housing 16 and extends downwardly therefrom at right angles. The midpoint of the torsion bar 54 passes through a cylindrical center plug 66 having a rectangular bore, the center plug 66 being in turn encased within a cylindrical sleeve 68 which extends concentrically within and between the pair of torsion tubes 62—62. The center plug 66 is drilled at the top to receive an assembly pin 70 extending downwardly therein from the cylindrical surface of the pivot lever 64 through the thickness of the sleeve 68. In this manner the pivot lever 64 is rigidly secured to the midpoint of the torsion bar 54 so that they move together as a unit, and further insuring that the angular relation between the pivot lever 64 and the supporting arms 22—22 remains constant. In operation, the support arm 22—22 will assume the slanting position shown in solid line and FIG. 5. As support arms 22—22 swing downward about the axles of the wheel 23—23 responsive to trailer loading transmitted laterally through the torsion bar housing 24 the entire torsion bar 54 will tend to rotate relative to its longitudinal axis, causing the slightly curved surface 72 of the pivot lever 64 to be urged into contiguous load-bearing contact with the inner vertical surface 74 of the rear of the control housing 16. Consistent with the collapsibility inherent in the construction of this invention, the support arms 22—22 when disassembled from the axles of the wheels 23—23 may be rotated into parallel alignment with the control housing 16, as shown in the dashed configuration 22-a with the corresponding pivot lever position 64a.

Figure 6:
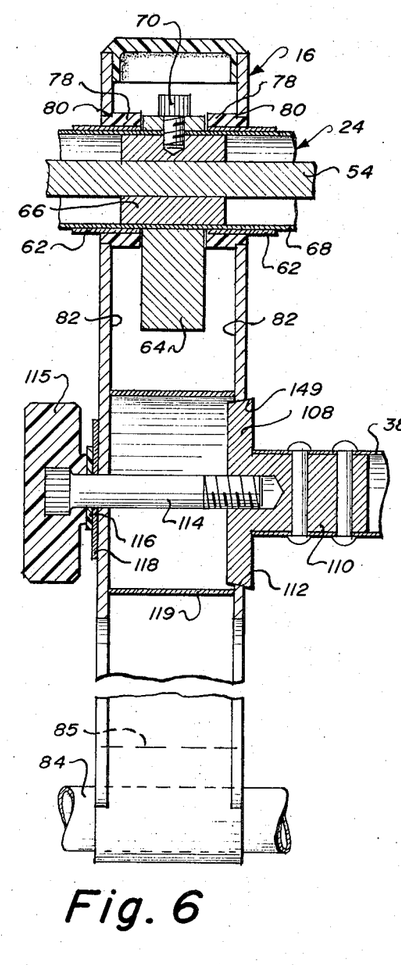
FIG. 6 is a section through the control housing taken along line 6—6 in FIG. 5. This view shows the manner in which the pivot lever is connected to the center plug surrounding the torsion bar as it extends through the upper part of the control housing. Additionally this view shows the facing ends of the outer torsion tubes together with the aligning inner sleeve extending between these facings ends. Also seen below the torsion bar housing are the internal connections between the tongue and the control housing showing a wedging disk affixed to one end of the tongue. At the bottom of the control housing there is seen a portion of the transverse member by means of which the frame may be rigidly attached to such housing.

In order to further understand the torsion bar assembly it is convenient to examine its internal construction in this collapsed position as seen in FIG. 6. To secure the torsion housing 24 within the control housing 16 and to permit friction free rotation of the torsion tubes 62—62 a pair of cylindrical plastic bushings 78—78 encircle the facing ends of the torsion tube 62—62. Each of bushings 78—78 is provided with a shoulder 80 adapted to contact the inner vertical side surfaces 82—82 of the control housing 16 so that side slippage of the torsion bar housing 24 is prevented.

The cylindrical sleeve 68, which effectively joins the torsion tubes 62—62, extends therein and terminates short of their connection to the elbows 56—56 as more easily seen in FIG. 4. It will now be appreciated that the sleeve 68 further insures the lateral stiffness of the torsion bar housing 24. However, since the sleeve 68 does not rotate with respect to the midpoint of the torsion bar 54 its interface with the inner surface of the torsion tubes 62—62 is thoroughly lubricated. This enables the torsion tubes 62—62 to rotate relative to the sleeve 68 and independently of each other so that the torsional forces generated on either side of the trailer 10 remain isolated.

CARRYING FRAME-TORSION BAR ASSEMBLY INTERCONNECTION

It may now be appreciated that the frame 28, the crossbrace 32 and the receptacle 46, together with the second pair of support arms 34—34 may be joined as a unit to the torsion bar assembly after the latter is positioned in relation to the trailer wheels 23—23. A lower transverse support member 84, as seen in FIGS. 5 and 6, is adapted to connect transversely between the forward ends of the second pair of the support arms 34—34 and fit within an upwardly open concave saddle portion 85 formed at the bottom of the control housing 16. The support arms 34—34 and the support member 84 may be joined integrally to form a U-shaped element pivotally connected to the side rails 30—30 so that when the carrying frame-receptacle combination is disengaged from the torsion bar assembly this U-shaped element may be folded against the frame 28 and associated structures for storage or transport.

After the support member 84 is positioned within the saddle 85 the mounting clamps 44—44 are snap-fitted in position over the torsion bar housing 24 so that a substantially rigid triangular interconnection is achieved between the frame 28, the control housing 16, and the second pair of support arms 34—34.

When the receptacle 46 is subjected to vertical loading the mounting clamps 44—44 exert a rearward force moment on the separate torsion tubes 62—62 while, through the support member 84, a forward force moment is exerted at the lower end of the control housing 16. At the same time the ends of the torsion bar 54 are subjected to torsional distortion about its midpoint. When the pivot lever 64 bears against the rear vertical surface 74 of the control housing 16, the entire trailer load is supported by this surface-to-surface contact. It will therefore be understood that the pivot lever 64 is desirably constructed of a relatively thick section of high strength alloy. Not only is the entire frame-receptacle combination cantilevered with respect to the control housing 16, but, additionally, loads at the extreme rearward end of the receptacle 46 are in effect cantilevered about the junction of the support arm 34—34 and the side rails 30—30. The farther back this junction is moved the greater becomes the forward moment at the bottom of the control housing 16. Thus the longitudinal position of such junction should be selected with these factors in mind.

The supporting arms 34—34 are each provided with an exterior lubricated cylindrical bushing 86, as in FIG. 3, extending along an intermediate section of the support arms 34—34 and adapted to make frictional contact with the adjacent surfaces of the first pair of supporting arms 22—22. With vertical motion of the frame 28 this contact provides an additional dampening effect, further contributing to the riding qualitites of the trailer 10. This contact also helps importantly to give the trailer 10 lateral stability and rigidity.

AXLE-SUPPORT ARM ASSEMBLY

Figure 7:
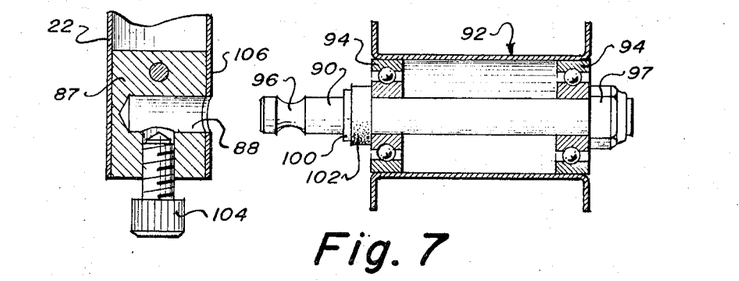
FIG. 7 is a detail in longitudinal section through the rearward end of one of the first pair of supporting arms together with a detail in vertical section through a hub on one of the trailer wheels, identifying the concave seating groove at one end of the axle.

The rearward end of each of the support arms 22—22 is provided with a solid plug 87 as seen in FIG. 7, having a transverse bore 88 therein adapted to receive one end of an axle 90 about which each of wheels 23—23 rotates. The construction of supporting elements for each wheel 23 is conventional as found for example in typical hospital wheelchairs, and may consist of a hub 92 mounted on ball bearings 94. The axle 90 includes adjacent one end a circumferential groove 96 of concave cross-section and may be threaded at the other end to receive a self-locking nut 97. Inward of the groove 96 the axle 90 is additionally provided with a cooperating circumferential slot which is adapted to accomodate a snapring 100 against which a bushing 102 is seated to give bearing support for the wheel assembly. The axle 90 may be inserted within the bore 88 so that a cap screw 104 is adapted to contact the groove 96 and thus urge the axle 90 transversely until the outer surface 106 of each of arms 22—22 bears against the wheel assembly thereby insuring positive stable interconnection.

TONGUE-CONTROL HOUSING ASSEMBLY

With further reference to FIG. 6 the means for pivotal interconnection between the tongue 14 and the control housing 16 are shown. A frustum-shaped disc 108 is affixed concentrically to the free end of the first section 38 of the tongue 14 by means of a stem portion 110 extending therein and riveted in place. The edge 109 of the disc 108 is bevelled, preferably at about 12° so that the narrower diameter surface thereof faces one of the vertical side surfaces 82 of the control housing 16 and is adapted to fit within a similarly bevelled circular aperture 112 in such surface 82 at an intermediate level of the housing 16.

Opposite the disc 108 and adapted to extend therein is a threaded shaft 114, the head of which is encased within a plastic control knob 115 positioned externally of the other side surface 82 of the control housing 16. A plastic washer 116 and a metal washer 118 are inserted continguously between the knob 115 and the surface 82 to provide friction free rotatability. By means of the control knob 115 the disc 108 may be secured in any desired rotational position by its wedging action within the aperture 112. In this manner the second section 40 of the tongue 14 may be releasably positioned at any desired elevation with respect to the horizontal.

To prevent the surfaces 82 from buckling inward under side pressure a cylindrical metal spacer 119 is positioned within the control housing 16 concentrically with the disc 108 so that it bears outwardly against the parallel side surfaces 82. It is important to note that the construction of the tongue 14, together with its manner of pivotal attachment to the control housing 16, is inherently adapted to provide a torsional restoring force about such point of attachment in the event of vertical loading at the forward end of the second tongue section 40.

TONGUE-COUPLING ASSEMBLY

Figure 8A:
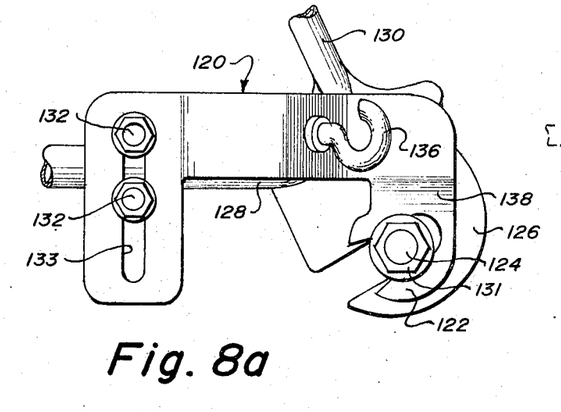
FIG. 8a is a detail in side elevation of the bracket which is connected between the axle of the rear wheel of the bicycle and a forwardly extending chasis portion.
Figures 8B, 8C:
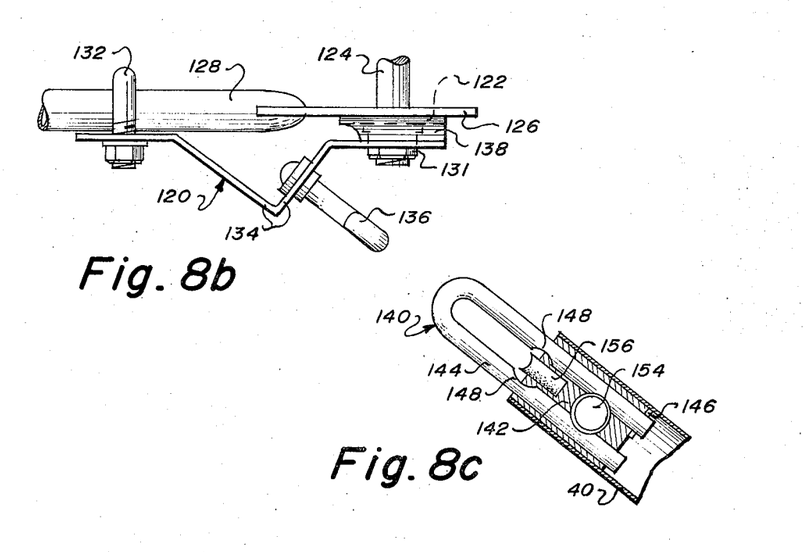
FIG. 8b shows the bracket in plan emphasizing the right-angular ridge portion and the swivel connection between the bracket and the hook.
FIG. 8c is a section taken along a generally horizontal plane through the forward end of the tongue showing the locking yoke in a fully extended and unlocked position.

In order to couple the trailer 10 to any desired propelling vehicle such as a bicycle 12, an elongated mounting bracket 120 may be employed, as seen in FIGS. 8a and 8b, formed preferably of a generally flat sheet steel stock suitably conformed to the typical spacial relation between a bicycle chassis and its rear wheel. One end of the bracket 120 terminates in a fork 122 engageable with the axle 124 of the rear wheel 20 of a bicycle 12 and bolted in place against a hanger plate 126 extending between and joining chassis members 128 and 130. The fork 122 may be secured by a plain nut 131 threaded on the axle 124 or alternatively with a wing nut. it will also be engageable without difficulty with the modern type of rear wheel axle which includes a so-called cam operated release. The other end of the bracket 120, which extends forward over the horizontal chassis number 128 may be fastened thereto by a U-bolt 132 positioned adjustably within a vertical slot 133.

An intermediate section of the bracket 120 is displaced outwards from the bicycle 12 to form a right-angular ridge 134, one wall of which is adapted to support a coupling hook 136 so that the latter is free to swivel in a complete circle. The hook 136 is to be aligned with the axis of the tongue section 40 as shown in FIG. 8c when the trailer 10 and the bicycle 12 are in operating alignment. To insure that the intermediate portions of the bracket 120 will clear the chassis member 128 a portion 138 of the bracket 120 lying adjacent to and above the fork 122 may be curved away from the hanger plate 126.

The forward end of the tongue section 40 is fitted with a locking yoke 140 slidably attached thereto within an end plug 142 for axial movement. In FIG. 8c the legs 144—144 of the yoke 140 are fully extended in a forward direction with a stop pin 146 resting against the rear portion of the end plug 142. The general plane of the yoke 140 lies so that in this extended condition its loop portion is easily engageable with the upwardly extending portion of the hook 136. If these parts are not properly aligned a simple adjustment of the tongue control knob 115 may be made to raise or lower the angle of the second tongue section 40.

Figure 8D:
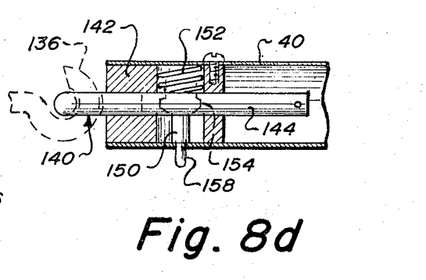
FIG. 8d is a section taken along a vertical plane through the center of the forward end of the tongue showing the yoke in a locked or retracted position and engaged with the coupling hook.

After engagement, the section 40 may be pushed forward against the hook 136, causing the yoke 140 to retract within the end of the section 40 as seen in FIG. 8d, until facing notch portions 148 on legs 144—144 lie opposite lock pin 150. A spring 152 then urges the lock pin 150 downward so that its head 154 fits within the notch portions 148, locking the yoke 140 against longitudinal movement. In this mode the hook 136 is securely captured and rests against a soft surfaced block 156 attached to the end plug 142 in order to prevent binding. Once engaged, the yoke 140 may swivel laterally through a wide angle about the hook 136, a 280° angular variation having been found easy to accomplish, thus permitting severe misalignment between the trailer 10 and the bicycle 12. At the same time the complete swivel action of the hook 136 allows the bicycle 12 to actually upset completely without causing corresponding upset of the trailer 10. To quickly release the coupling assembly it is simply necessary to push the release button 158 to compress spring 152 and allow the yoke 140 to again be extended to the unlocked position.

In order to render the carrying capabilities of the receptacle 46 of the trailer this invention more versatile, a stiff partition 160 as seen in FIG. 2 may be used to separate its front end rear portion at any desired point. The partition 160 may be fitted at the bottom with a pair of rubber pegs 162—162 engageable with any of the holes 164—164 extending longitudinally of the bottom insert 48. The top of the partition 160 may be notched at its center to receive a knotted rope 166 one end of which may be fastened to the front crossbrace 32.

In summary it should be emphasized that the trailer of this invention is collapsible, without the use of hand tools, into three major components for hand carriage or storage, namely, the torsion bar assembly with tongue attached, the carrier frame-receptacle combination, and the supporting wheels. These three components may be fitted against each other in a relatively thin package easily secured by an expansible cord or other similar fastener. The coupling bracket 120 may of course remain attached to the bicycle 12 or other propelling vehicle.

Although this invention has been described with a certain degree of particularity, it is understood that the present disclosure has been made only by way of example and that numerous changes in the details of construction and the combination and arrangement of parts may be resorted to without departing from the spirit and the scope of the invention as hereinafter claimed.

What is claimed is:
1. In a two-wheeled trailer having a carrying receptacle depending from a frame supported between the wheels, wherein the wheels are mounted on separate axles, a suspension system comprising:
   a. a pair of supporting arms extending upwardly and forwardly from the axles on either side of the receptacle;
   b. a torsion bar connected between the forward ends of the pair of supporting arms and adapted to extend transversely in front of the frame so that the torsion bar tends to rotate relative to its longitudinal axis with variation in the inclination of the pair of supporting arms;
   c. an elongated hollow housing extending vertically in front of the receptacle equidistant between the wheels, said housing being adapted to receive the torsion bar there-through adjacent its upper end;
   d. means within the housing fixed to the midpoint of the torsion bar for limiting the rotation of such midpoint relative to the longitudinal axis of the torsion bar;
   e. means for interconnecting a point intermediate the front and rear of the frame in fixed relation to the lower end of the housing; and
   f. means extending forwardly from the front of the frame for interconnecting such frame in pivotal relation to the torsion bar.

2. In a two-wheeled trailer having a flexible receptacle depending from a frame supported between the wheels, wherein the wheels are mounted on separate axles, a suspension system comprising:

a. a first pair of supporting arms extending upwardly and forwardly from the axles on either side of the receptacle;

b. a torsion bar connected between the forward ends of the first pair of supporting arms so that the torsion bar tends to rotate relative to its longitudinal axis with variation in the inclination of the first pair of supporting arms;

c. a pair of like cylindrical tubes substantially encasing the two halves of the torsion bar respectively, in coaxially spaced relation therewith, the tubes being connected respectively to the two forward ends of the first pair of supporting arms and extending toward each other therefrom so that their facing ends are adjacent;

d. a cylindrical sleeve extending concentrically within and between the pair of tubes in rotatable touching relation to the inner surfaces thereof so that said tubes are maintained in axial alignment;

e. a hollow elongated housing extending vertically in front of the receptacle equidistant between the wheels, said housing being adapted to support therein the facing ends of the tubes adjacent its upper end so that said tubes are free to rotate within the housing;

f. means within the housing fixed to the midpoint of the torsion bar, said means being cooperable with the housing for limiting the rotation of such midpoint relative to the longitudinal axis of the torsion bar;

g. a second pair of supporting arms extending forwardly and downwardly from a point intermediate the front and rear of the frame and inwardly of the first pair of supporting arms;

h. means for transversely interconnecting the forward ends of the second pair of supporting arms in fixed relation to the lower end of the housing; and i. means extending forwardly from the frame on either side thereof for clamping the frame in pivotal relation to the two cylindrical tubes respectively.

3. An apparatus as in claim 2 wherein said means for limiting the rotation of the midpoint of the torsion bar comprises a pivot lever fixed to the midpoint of the torsion bar and extending therefrom at right angles to the longitudinal axis thereof between the facing ends of the cylindrical tubes, so that rotation of the midpoint of the torsion bar urges the pivot lever into contiguous load-bearing contact with an inner vertical surface of the vertical housing.

4. A device as in claim 2 wherein the lower end of the housing terminates in an upwardly open concave saddle facing the receptacle, said saddle being adapted to receive therein such means for transversely interconnecting the forward ends of the second pair of supporting arms.

5. A device as in claim 2 wherein the frame comprises at least a pair of transversely braced longitudinal side rails and wherein said clamping means comprises a pair of plastic mounting clamps affixed respectively to the forward ends of the longitudinal side rails and extending axially therefrom, said mounting clamps each being provided with a downwardly opening annular groove adapted to be snap fit over the surface of the cylindrical tubes.

6. A device as in claim 2 wherein said second pair of supporting arms are each provided with an exterior lubricated cylindrical bushing extending partially there along and adapted to make frictional contact with the adjacent surfaces respectively of the first pair of supporting arms so that motion of the frame is additionally dampened by the friction between said bushing and the surface of said first pair of supporting arms.

7. A device as in claim 2 wherein the rearward end of each of said first pair of supporting arms is provided with a transverse bore adapted to receive therein one end of each of the respective axles of the trailer wheels, each of said arms being additionally provided with a locking screw adapted to extend from said rearward end into said transverse bore, and each of said axles being provided with a circumferential groove of concave cross-section adjacent said one end, so that when said locking screws contact the surfaces of said circumferential grooves the axles are urged transversely with respect to said first pair of supporting arms.

8. A device as in claim 2 wherein said second pair of supporting arms and said means for transversely interconnecting the forward ends of said second pair of supporting arms are integrally joined to each other and in pivotal relation to the frame.

9. A device as in claim 2 additionally comprising a pulling tongue pivotally attached to said housing intermediate said upper and lower ends so that it is adapted to rotate about a transverse axis.

10. A device as in claim 9 wherein said pulling tongue comprises a first and a second straight tubular section joined integrally at a predetermined acute angle, means for pivotally connecting the free end of the first section to the vertical housing so that said first section extends transversely to the receptacle, said connecting means additionally including means for continuously adjusting the inclination of the second section with respect to the horizontal responsive to rotation of the first section about its own longitudinal axis.

11. A device as in claim 10 wherein the housing additionally includes a circular aperture aligned with the free end of the first section of the tongue, and wherein said means for pivotally connecting said first section to the vertical housing comprises:

a. a frustum-shaped disc element affixed to the free end of the first section concentrically therewith and extending radially outward thereof with its narrower diameter facing the housing; and b. a manually operable threaded shaft extending transversely through the housing and into the disc, so that by turning the shaft the disc may be drawn into the aperture and releasably secure therein in any rotational position by the wedging action of the disc against the aperture.

12. In a bicycle-trailer combination wherein a pulling tongue is coupled from the trailer to the bicycle and wherein he bicycle has a chassis member extending forward from the axle of the rear wheel thereof the improvement comprising:

a. an elongated mounting bracket having a forked end mountable over the axle, the other end of said bracket being adapted to be anchored to the chassis forward of the axle;

b. a coupling hook affixed to said bracket intermediate its two ends and extending therefrom outward from the chassis at a predetermined angle to the general plane of the bracket;

c. a locking yoke slidably attached within the forward end of the tongue and having a loop portion extending axially therefrom for swivel engagement with the coupling hook; and d. spring actuated means for locking the yoke in relation to the tongue responsive to the retraction of the yoke within the end of the tongue.

13. In a two-wheeled trailer having a carrying receptacle depending from a frame supported between the wheels, wherein the wheels are mounted on separate axles, a torsion bar assembly comprising:

a. a pair of supporting arms extending upwardly and forwardly from the axles on either side of the receptacle;

b. a torsion bar connected between the forward ends of the pair of supporting arms and adapted to extend transversely in front of the frame so the torsion bar tends to rotate relative to its longitudinal axis with variation in the inclination of the pair of supporting arms;

c. a pair of like cylindrical tubes substantially encasing the two halves of the torsion bar respectively and coaxially spaced relation therewith, the tubes being connected respectively to the two forward ends of the pair of supporting arms and extending toward each other therefrom so that their facing ends are adjacent;

d. a cylindrical sleeve extending concentrically within and between the pair of cylindrical tubes in rotatable touching relation to the inner surfaces thereof so that said tubes are maintained in axial alignment;

e. a hollow rectangular housing extending vertically in front of the receptacle equidistant between the wheels, said housing being adapted to support therein the facing ends of the tubes so that they are free to rotate within the housing; and f. a pivot lever within the housing fixed to the midpoint of the torsion bar between the facing ends of the tubes and depending therefrom at right angles to the longitudinal axis of the torsion bar, said pivot lever being adapted to rotate into contiguous load-bearing contact with the rear inner vertical surface of the housing responsive to downward rotation of the pair of supporting arms.

* * * * *